US006565631B2

(12) United States Patent
Koros et al.

(10) Patent No.: US 6,565,631 B2
(45) Date of Patent: May 20, 2003

(54) HIGH CARBON CONTENT FILAMENTARY MEMBRANE AND METHOD OF MAKING THE SAME

(75) Inventors: William John Koros, Austin, TX (US); De Quang Vu, Austin, TX (US)

(73) Assignee: The University of Texas System, Austin, TX (US)

( * ) Notice: Subject to any disclaimer, the term of this patent is extended or adjusted under 35 U.S.C. 154(b) by 0 days.

(21) Appl. No.: 09/970,541

(22) Filed: Oct. 3, 2001

(65) Prior Publication Data

US 2002/0033096 A1 Mar. 21, 2002

Related U.S. Application Data

(63) Continuation of application No. 09/437,993, filed on Nov. 10, 1999, now Pat. No. 6,299,669.

(51) Int. Cl.⁷ .......................... B01D 53/22; B01D 69/08
(52) U.S. Cl. ........................ 96/8; 95/51; 96/10; 96/14; 55/DIG. 5
(58) Field of Search ................ 95/45, 51; 96/8, 96/10, 14; 55/522, 527, 528, DIG. 5

(56) References Cited

U.S. PATENT DOCUMENTS

| 4,130,403 A | 12/1978 | Cooley et al. ............... 95/51 |
| 4,518,399 A | 5/1985 | Croskell et al. ............ 95/51 |
| 4,685,940 A | 8/1987 | Soffer et al. ............... 55/158 |
| 5,234,471 A | 8/1993 | Weinberg ..................... 95/51 |
| 5,288,304 A | 2/1994 | Koros et al. ................. 95/45 |
| 5,334,471 A | 8/1994 | Sacripante et al. ....... 430/106.6 |
| 5,411,721 A | 5/1995 | Doshi et al. ................. 95/51 |
| 5,591,250 A | 1/1997 | Stern et al. .................. 95/51 |
| 6,299,669 B1 * | 10/2001 | Koros et al. ................. 95/51 |

FOREIGN PATENT DOCUMENTS

| EP | 0459623 B1 | 8/1994 |
| JP | 08-047626 | 6/1996 |

* cited by examiner

*Primary Examiner*—Robert H. Spitzer
(74) *Attorney, Agent, or Firm*—Richard J. Schulte

(57) ABSTRACT

A high carbon content membrane and method for making the same are disclosed. The carbon membrane includes an asymmetric hollow filamentary carbon membrane, including a partial carbonization product of an asymmetric hollow filament including an aromatic imide polymer material. The carbon membrane is at least 95 weight percent carbon, and has a dense layer located in the outside surface portion of the hollow filamentary membrane and a porous base layer continued from the dense layer and located in the inside portion of the hollow filamentary membrane. A process for separating $CO_2$ from natural gas is described including: contacting a mixture of $CO_2$ and natural gas with a first side of a carbon membrane in a manner to cause a portion of the mixture to pass through the carbon membrane to a permeate side. The resulting mixture on the permeate side becomes enriched in $CO_2$ over that of the mixture on the first side. The contacting step occurs at a pressure of at least about 200 psia.

25 Claims, 3 Drawing Sheets

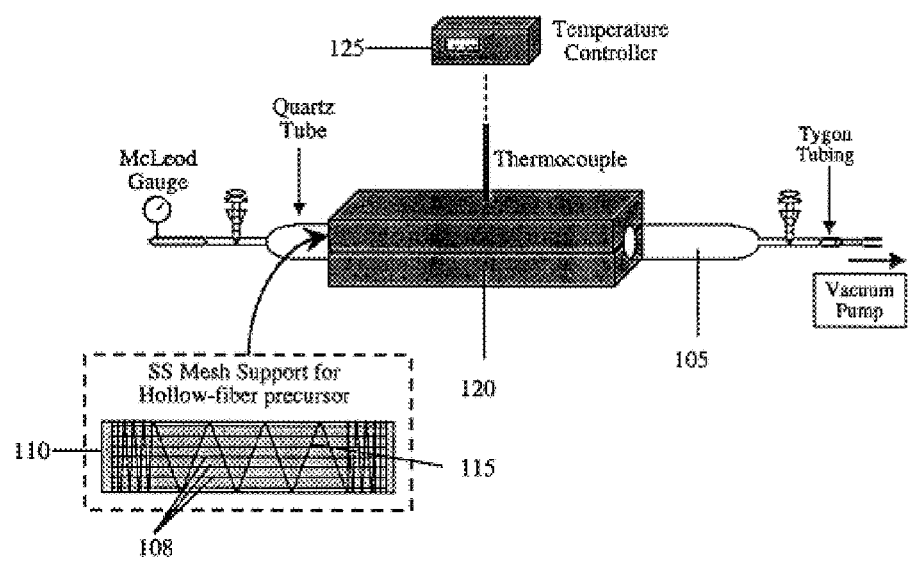
Figure 1. Diagram of quartz tube furnace used for pyrolysis of polymeric precursors.

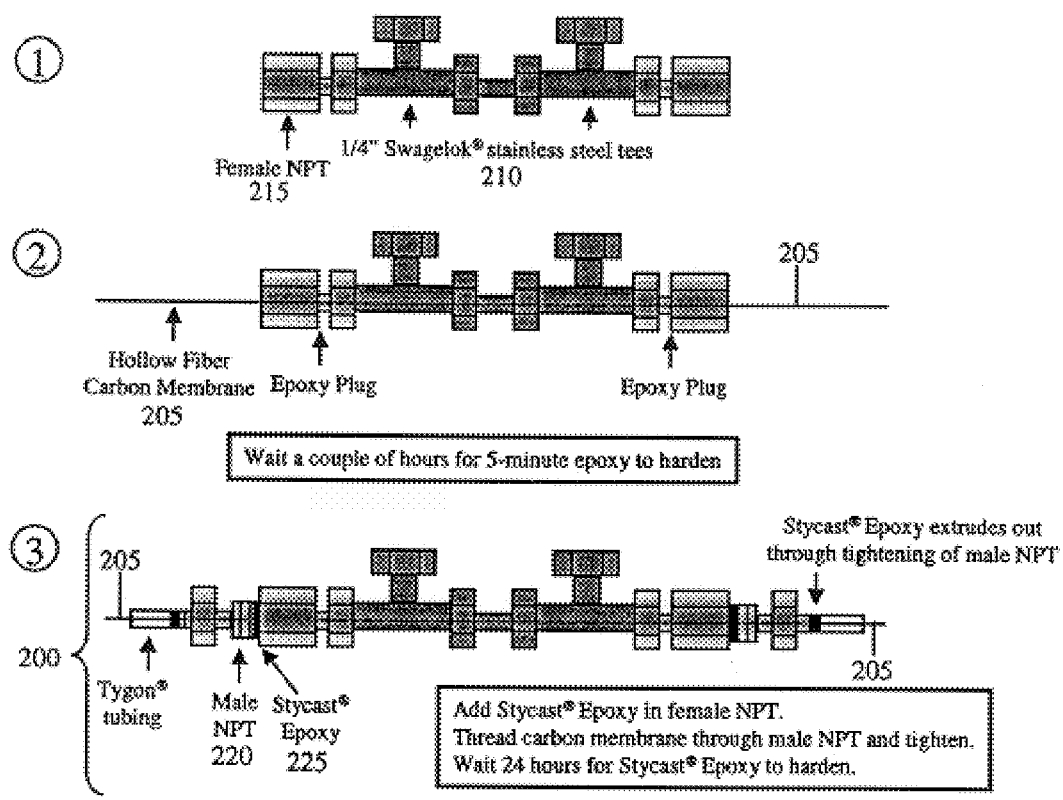

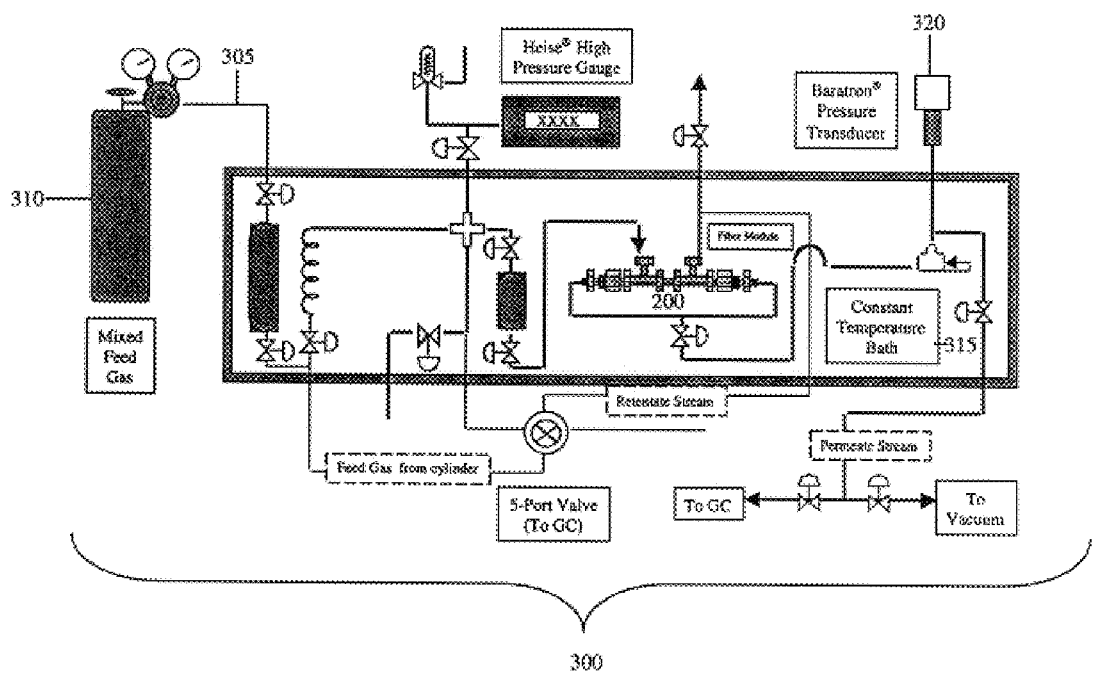
Figure 3. Permeation testing system for membrane fiber modules.

HIGH CARBON CONTENT FILAMENTARY MEMBRANE AND METHOD OF MAKING THE SAME

CROSS REFERENCE TO RELATED APPLICATIONS

This application is a Continuation of U.S. application Ser. No. 09/437,993, filed Nov. 10, 1999, now issued as U.S. Pat. No. 6,299,669.

I. FIELD OF THE INVENTION

The present invention relates to a process of using a carbon membrane for separations, especially separations of $CO_2$ from natural gas.

II. BACKGROUND OF THE INVENTION

A. Introduction

The use of membranes for separation processes is well known. Certain carbon membranes are particularly useful for the separation of fluids, especially gases such as oxygen and nitrogen.

The membranes may be fabricated in various geometrical configurations, such as sheet formed membranes and hollow fibers. The membranes may be symmetrical, asymmetrical, single-component or composite.

B. Problems With Existing Membranes

It is known that impurities including heavy, condensable hydrocarbons, i.e., $C_6$ and greater, substantially reduce separation performance of polymeric membranes. One study, for example, reported harsh performance declines in the range of 50% reduction in $CO_2/CH_4$ selectivity for polyimide polymeric films due to saturated concentrations of toluene or n-hexane in mixed gas feeds of $CO_2/CH_4$. See J. Membrane Sci., 103, 73–82.

Carbon membranes have superior selectivities and productivities for many separations. However, like polymeric membranes, they also have the major problem of being vulnerable to fouling due to impurities in various hydrocarbon compounds. For example, certain hydrocarbon impurities cause selective fouling of the carbon membrane resulting in reduced selectivity.

Such impurities intolerance is reported in the scientific literature, e.g., one study showed that, for $O_2/N_2$ separation, a carbon molecular sieve ("CMS") membrane performance deteriorated rapidly with n-hexane saturated air feed, Carbon, 32 (1427), and another study showed that, with a mixed feed gas of 50/50 $H_2/CH_4$ with toluene vapor at low pressures (150 psia), fluxes were reduced by 15 to 20%, and the $H_2/CH_4$ selectivity was reduced by 14%. (J. Membrane Sci., 160, 179–186).

Even small amounts of such hydrocarbons can significantly impair the performance of the membrane. Impurities may be removed from the fluid to be permeated by various filtration, separation or extraction techniques. These measures may involve the use of large, expensive equipment and are often not successful.

Another deficiency of known carbon membranes is an inability to perform well with high pressure feeds. The feed, e.g., for a natural gas-$CO_2$ separation process is typically directly from the well. It is desirable to avoid pressure loss through the purification process. Reducing the pressure to satisfy membrane pressure limits is economically disadvantageous. If pressure is reduced, expensive compressors may be required to increase the pressure of the stream for passage through an export pipeline.

C. Known Methods For Making Membranes

There are several patents describing processes for producing carbon membranes (both asymmetric hollow "filamentary" and flat sheets) and applications for various gas separations. These patents teach separations of $O_2/N_2$, $H_2/CH_4$, $CO_2/N_2$, or other separations. See, e.g., U.S. Pat. No. 4,685,940 for a Separation Device, U.S. Pat. No. 5,288,304 for Composite Carbon Fluid Separation Membranes, and EP Patent No. 459,623 for Asymmetric Hollow Filamentary Carbon Membrane And Process For Producing Same, each of which is incorporated herein by reference in their entireties. None of these patents teaches $CO_2/CH_4$ separation, especially at high pressure or in the presence of impurities.

D. Deficiencies In Known Processes For Making Membranes

The prior art references do not teach a process for $CO_2$—natural gas separation using a carbon membrane at high pressures and in the presence of impurities. Therefore, it would be advantageous to have a process of preparing a carbon membrane having high fouling resistance and having high selectivity and having good performance in high pressures. The process of the instant invention meets these needs.

III. SUMMARY OF THE INVENTION

The invention includes a process for separating $CO_2$ from natural gas including: contacting a mixture of $CO_2$ and natural gas with a first side of a carbon membrane in a manner to cause a portion of the mixture to pass through the carbon membrane to a permeate side. The resulting mixture on the permeate side becomes enriched in $CO_2$ over that of the mixture on the first side. The carbon membrane includes an asymmetric hollow filamentary carbon membrane, including a partial carbonization product of an asymmetric hollow filament including an aromatic imide polymer material. The carbon membrane is at least 95 weight percent carbon, and has a dense layer located in the outside surface portion of the hollow filamentary membrane and a porous base layer continued from the dense layer and located in the inside portion of the hollow filamentary membrane. The contacting step occurs at a pressure of at least about 200 psia.

IV. BRIEF DESCRIPTION OF THE DRAWINGS

FIG. 1 depicts, in one embodiment of the invention, apparatus for the pyrolysis aspect of the invention.

FIG. 2 depicts, in one embodiment of the invention, apparatus for forming one or more pyrolyzed CMS's into a separation module.

FIG. 3 depicts, in one embodiment of the invention, a schematic diagram of the process of the invention.

V. DETAILED DESCRIPTION OF PREFERRED EMBODIMENTS

A. Methodology of Formation of Carbon Membranes

1. The Fiber

U.S. Pat. No. 5,288,304 teaches generally a method for preparation of carbon molecular sieve membranes. That disclosure is incorporated herein by reference in its entirety. A polymeric fiber is the starting material for preparation of the carbon molecular sieve membranes. The polymeric fiber used is any suitable polyimide spun by any conventional method, e.g., spun from a polymer solution through a spinneret. The polyimide is derived from a reaction of any suitable reactants. In one preferred embodiment of the invention, the reactants are three monomers: 2,4,6-trimethyl-1,3-phenylene diamine, 5,5-[2,2,2-trifluoro-1-(trifluoromethyl) ethylidene]-1,3-isobenzofurandion, and 3,3',4,4'-biphenyl tetra carboxylic acid dianhydride. Its chemical structure is shown below.

unit. The number of fibers bundled together will depend on fiber diameters, lengths, and porosities and on desired throughput, equipment costs, and other engineering considerations understood by those in the chemical engineering arts.

The fibers are held together by any conventional means. This assembly is then typically disposed in a pressure shell

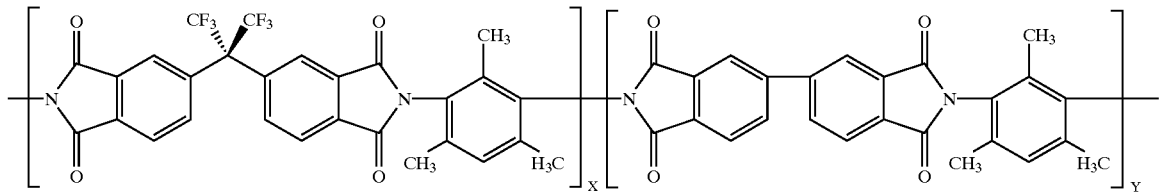

Such fibers were obtained from E.I. du Pont de Nemours and Company and L'Air Liquide S.A. This polymer is taught in U.S. Pat. No. 5,234,471, which disclosure is incorporated by reference in its entirety. Without limiting the invention, such commercially available polymeric fibers typically have an outer diameter of about 250 µm and an inner diameter of about 160 µm.

2. Pyrolysis of the Fiber

Individual fibers of a desired length are then pyrolyzed. The fibers are placed on a piece of stainless steel mesh and held in place by any conventional means, e.g., by wrapping a length of bus wire around the mesh and fibers. The mesh support and fibers are then placed in any suitable pyrolysis zone, e.g., in quartz tube of which sits in a Thermcraft® tube furnace. The tube is substantially centered so that the entire fiber length is within the effective heating zone. The pressure during pyrolysis is from about 0.01 mm Hg to about 0.10 mm Hg. In one preferred embodiment, the system is evacuated until the pressure is 0.05 mm Hg or lower.

The pyrolysis follows a heating cycle as follows: The fibers are carbonized to a specific structural morphology and carbon composition by controlling the heating protocol with three critical variables: temperature set points, rate at which these temperature set points are reached ("ramp"), and the amount of time maintained at these set points ("soak"). The pyrolysis can be operated with final temperature set points up to about 1000° C., preferably up to at least 500° C. as the final set point temperature, and more preferably from about 550° C. to about 800° C. as the final set point temperature. The pyrolysis "soak" times can be performed with times up to about 10 hours, preferably at least about 1 hour, and more preferably from about 2 hours to about 8 hours. In one preferred embodiment, the heating cycle is initiated with the following protocol (where SP=set point): start at SP0 which is about 50° C. then heated to SP1 which is about 250° C. at a rate of about 13.3° C./min, then heated to SP2 which is about 535° C. at a rate of about 3.85° C., then heated to SP3 which is about 550° C. at a rate of about 0.25° C./min; the SP3 which is about 550° C. is maintained for about 2 hours. After the heating cycle is complete, the system is typically allowed to cool under vacuum. The carbon membranes are removed once the system temperature drops below about 40° C. One suitable arrangement of equipment for the pyrolysis step in the process is shown in FIG. 1, which is discussed in detail in the Illustrative Embodiments section below.

B. Methodology of Fiber Module Construction

For laboratory or commercial use, a suitable plurality of the pyrolyzed fibers is bundled together to form a separation such that one end of the fiber assembly extends to one end of the pressure shell and the opposite end of the fiber assembly extends to the opposite end of the pressure shell. The fiber assembly is then fixably or removably affixed to the pressure shell by any conventional method to form a pressure tight seal.

The unit is then operated, e.g., as a shell-tube heat exchanger, where the feed is passed to either the shell or tube side at one end of the assembly and the product is removed from the other end. For maximizing high pressure performance, the high pressure feed is typically fed to the shell side of the assembly. At least a portion of the $CO_2$ in the feed passes through the membrane to the tube side, i.e., inside the membranes. $CO_2$ depleted feed is then removed from the opposite end of the shell side of the assembly. Any conventional recycle scheme may be optionally used to optimize a desired purity level.

In order to perform permeation tests, for example, a test module consisting of a single CMS fiber is constructed, as shown in FIG. 2. Details of fabricating the module are given in the Illustrated Embodiments section below.

C. Operating Conditions

The process is operated with a feed pressure of from about 20 psia to about 4000 psia, preferably at least about 50 psia, and more preferably from about 200 psia to about 1000 psia. The feed temperature is its ambient temperature, e.g., its temperature as produced from the well.

VI. ILLUSTRATIVE EMBODIMENTS

The invention will be further clarified by the following Illustrative Embodiments, which are intended to be purely exemplary of the invention. The results are shown below.

A. Methodology of Formation of Carbon Membranes

Reference is made to FIG. 1. The carbon membranes were produced by pyrolyzing hollow fiber polymeric materials in a quartz tube 105. The polymeric fiber was a polyimide spun from a polymer solution through a conventional, commercially available spinneret. The polyimide was derived from a reaction of three monomers: 2,4,6-trimethyl-1,3-phenylene diamine, 5,5-[2,2,2-trifluoro-1-(trifluoromethyl) ethylidene]-1,3-isobenzofurandion, and 3,3',4,4'-biphenyl tetra carboxylic acid dianhydride. Its chemical structure was as previously shown. The membrane fibers were obtained from E.I. du Pont de Nemours and Company and L'Air Liquide S.A. The polymeric fibers had an outer diameter of 250 μm and an inner diameter of 160 μm.

Individual fibers 108 (36 to 37 cm in length) were placed on a piece of stainless steel mesh 110 (about 39 cm by 4.2 cm) and held in place by wrapping a length of bus wire 115 (24 AWG, soft bare copper) around the mesh and fibers. The mesh support 110 was 14 mesh, 0.020 woven. The mesh support 110 and fibers 108 were then placed in a quartz tube 105 of 2-inch diameter which sits in a 24-inch Thermcraft® tube furnace 120. The tube 105 was centered so that the entire fiber length is within the effective heating zone. The system was evacuated until the pressure is 0.05 mm Hg or lower.

The heating cycle was controlled by temperature controller 125. It was initiated with the following protocol (where SP=set point): start at SP0=50° C., then heated to SP1=250° C. at a rate of 13.3° C./min, then heated to SP2=535° C. at a rate of 3.85° C., then heated to SP3=550° C. at a rate of 0.25° C./min; the SP3=550° C. is maintained for 2 hours. After the heating cycle is complete, the system was allowed to cool under vacuum. The carbon membranes were removed once the system temperature drops below 40° C.

B. Methodology of Single Fiber Module Construction

Reference is made to FIG. 2. In order to perform permeation tests, a module 200 consisting of a single CMS fiber 205 was constructed. The module 200 is fabricated from two stainless steel (316) Swagelok® ¼-inch tees 210, stainless steel ¼-inch tubing and nuts, two brass NPT ¼-inch female-tube adapters 215, two brass NPT ¼-inch male-tube adapters 220, and two brass Swagelok® ¼-inch nuts. The hollow fiber CMS membrane 205 is threaded through the module housing, so that a length of carbon fiber extends on each end. The ends of the module are then plugged with Stycast® 2651 epoxy 225 (from Emerson-Cuming Company) cured for overnight. The ends of the CMS membrane 205 are snapped off after the epoxy hardens.

C. Methodology of Membrane Testing System

Reference is made to FIGS. 2 and 3. The permeation testing for the CMS fibers 205 was performed with single-fiber test modules 200. Gas transport through the CMS membranes was examined with a pressure-rise permeation testing system 300. The system permitted high-pressure testing of mixed feed gas and sampling of gas streams with a gas chromatograph. The module 200 was attached in a shell feed method of operation. Mixed feed gas 305 from a compressed gas cylinder 310 was supplied on the shell-side of a single-fiber test module 200. The module 200 and ballast volumes were placed in a circulating water bath 315 to control and maintain a constant temperature.

Vacuum was pulled on both the shell- and bore-side of the hollow fiber membrane 205 first for overnight before testing. Permeate at the two ends from the bore-side of the CMS fiber was pulled by vacuum through a downstream sample volume. The permeation rate was measured from the pressure rise of a Baratron® pressure transducer 320 over time after closing the valve to vacuum. The pressure rise was plotted on chart recorder. The compositions of all the streams can be determined by a gas chromatograph. Individual gas fluxes were then calculated. The plumbing of the system consisted of stainless steel (316) Swagelok® ¼-inch and ⅛-inch fittings and tubing, Whitey® and Nupro® valves with welded elements. The system is rated for over 1500 psia pressure.

EXAMPLE 1

CMS hollow fiber membranes were prepared as described in Sections A and B. Elemental analysis (electron spectroscopy for chemical analysis) indicated the presence of 95% atomic carbon and 5% atomic oxygen. Scanning electron micrographs (SEM) indicated an outer diameter of 150 to 170 μm and an inner diameter of 90 to 110 μm. The approximate mass loss is 30 to 35%. The approximate fiber length shrinkage was 10 to 25%.

Permeation tests were performed according to Section C. above with mixed feed gas of 10% $CO_2$ and 90% $CH_4$ at three different temperatures (24° C., 35° C., 50° C.) and feed pressures up to 1000 psia. Results are shown in Table 1 below for the 200 to 1000 psia feed pressure range. Permeance is defined as the pressure-normalized flux of a given compound. The table includes $CO_2$ permeance ($P_{CO2}/l$) and the permeance ratio ($P_{CO2}/P_{CH4}$). The effective thickness, l, in the permeance is the same for both compounds. Both $P_{CO2}/l$ and $P_{CO2}/P_{CH4}$ decreased with increasing feed pressure, postulated (without intending to limit the scope of the invention) to be primarily due to gas-phase non-idealities (use of partial pressure driving force in the calculation of permeabilities, instead of partial fugacities) and a dual-mode sorption effect.

TABLE 1

| Temperature | $P_{CO2}/l$ ($10^{-6}$ cm³ (STP)/ cm² · s · cm Hg) | | $P_{CO2}/P_{CH4}$ | |
|---|---|---|---|---|
| (° C.) | 200 psia | 1000 psia | 200 psia | 1000 psia |
| 24 | 32 (±5) | 23 (±5) | 69 (±7) | 59 (±7) |
| 35 | 42 (±6) | 30 (±6) | 61 (±3) | 52 (±3) |
| 50 | 57 (±3) | 44 (±3) | 52 (±4) | 45 (±4) |

EXAMPLE 2

CMS hollow fibers fabricated from Example 1 were subjected to experiments with toluene exposure for the 200 to 1000 psia feed pressure range. Permeation tests were performed according to Section C. with mixed feed gas of 10% $CO_2$ and 90% $CH_4$ for two cases: (1) Case 1 containing a third component of 70.4 ppm toluene and (2) Case 2 containing a third component of 295 ppm toluene. Two temperatures were evaluated for each case: 35° C. and 50° C. Results for Case 1 over the 200 to 1000 psia feed pressure range are shown in Table 2. Similar results were obtained for Case 2. Comparisons with the pre-exposure results for the same module indicate that $CO_2$ permeance ($P_{CO2}/l$) was reduced by approximately 15 to 20% for either toluene case, while the permeance ratio ($P_{CO2}/P_{CH4}$) remained approximately constant.

TABLE 2

| Temperature | $P_{CO2}/l$ ($10^{-6}$ cm³ (STP)/ cm² · s · cm Hg) | | $P_{CO2}/P_{CH4}$ | |
|---|---|---|---|---|
| (° C.) | 200 psia | 1000 psia | 200 psia | 1000 psia |
| 35 | 33 | 22 | 63 | 51 |
| 50 | 44 | 33 | 55 | 44 |

EXAMPLE 3

CMS hollow fibers fabricated from Example 1 were subjected to experiments with n-heptane exposure for the 200 to 1000 psia feed pressure range. Permeation tests were performed according to Section C with mixed feed gas of 10% $CO_2$ and 90% $CH_4$ for two cases: (1) Case 1 containing a third component of 100 ppm n-heptane and (2) Case 2 containing a third component of 302 ppm n-heptane. Two temperatures were evaluated for each case: 35° C. and 50° C. Results for Case 2 over the 200 to 1000 psia feed pressure range are shown in Table 3. Similar results were obtained for Case 1. Comparisons with the virgin 10% $CO_2$/90% $CH_4$ results for the same module indicate that $CO_2$ permeance ($P_{CO2}$/l) was reduced by approximately 10 to 15% for either n-heptane case, while the permeance ratio ($P_{CO2}/P_{CH4}$) remained approximately constant.

TABLE 3

| Temperature | $P_{CO2}$/l ($10^{-6}$ cm$^3$ (STP)/ cm$^2$ · s · cm Hg) | | $P_{CO2}/P_{CH4}$ | |
| --- | --- | --- | --- | --- |
| (° C.) | 200 psia | 1000 psia | 200 psia | 1000 psia |
| 35 | 43 | 33 | 64 | 57 |
| 50 | 57 | 45 | 49 | 42 |

EXAMPLE 4

A regeneration method was performed on the CMS hollow fibers from Examples 2 and 3 after experiments with toluene and n-heptane exposure, respectively. The system (with module still connected) was depressurized back to atmospheric and purged with $N_2$ gas feed (extra-dry grade) on the shell-side (at a pressure of approximately 50 psia) with the retentate stream open for approximately 20 cm$^3$/min of flow. With $N_2$ gas flowing, three heating stages were performed on the module in the water bath: 90° C. for approximately 7 hours, 50° C. for overnight for one day, and 35° C. for overnight for another day. After the overnight purges of $N_2$ gas, vacuum was pulled on the entire system (upstream and downstream) for overnight.

The permeation behavior of the CMS fiber was then examined again with 10% $CO_2$/90% $CH_4$ mixed feed gas (no organic vapor impurity). Results from the module exposed to 302 ppm n-heptane after the regeneration method are shown in Table 4. Improvement in performance was observed for both temperatures. The $P_{CO2}$/permeance was restored to approximately 90 to 95% of the virgin module performance prior to organic exposure with again no reduction in the $P_{CO2}/P_{CH4}$ ratio.

Similar results were achieved for other modules exposed to organic vapor impurity and post-treated with the above regeneration method. Typical performance recoveries ranged from 90% to 100% of the original performance prior to experiments with organic vapor impurities with no reduction in the $P_{CO2}/P_{CH4}$ ratio.

TABLE 4

| Temperature | $P_{CO2}$/l ($10^{-6}$ cm$^3$ (STP)/ cm$^2$ · s · cm Hg) | | $P_{CO2}/P_{CH4}$ | |
| --- | --- | --- | --- | --- |
| (° C.) | 200 psia | 1000 psia | 200 psia | 1000 psia |
| 35 | 45 | 34 | 62 | 56 |
| 50 | 60 | 47 | 51 | 45 |

COMPARATIVE EXAMPLE B

A module consisting of aromatic polyimide hollow fibers and prepared in a similar fashion as described previously (with 50 fibers instead of a single fiber) was evaluated. Permeation tests were performed as described above with mixed feed gas of 10% $CO_2$ and 90% $CH_4$ at 50° C. and feed pressures up to 800 psia. The aromatic polyimide fibers broke at pressures greater than 850 psia. Results are shown in Table 5 below.

TABLE 5

| Temperature | $P_{CO2}$/l ($10^{-6}$ cm$^3$ (STP)/ cm$^2$ · s · cm Hg) | | $P_{CO2}/P_{CH4}$ | |
| --- | --- | --- | --- | --- |
| (° C.) | 200 psia | 800 psia | 200 psia | 800 psia |
| 50 | 18 | 15 | 17 | 20 |

COMPARATIVE EXAMPLE B

The module in Comparative Example A was evaluated for the two cases described in Example 2. Results indicated drastic losses to the $P_{CO2}/P_{CH4}$ ratio due to the organic vapor impurities. Results for Case 1 (70.4 ppm toluene organic vapor impurity) over the 200 to 800 psia feed pressure range at 50° C. are shown in Table 6 below.

Comparisons with the pre-exposure results for the same module indicated that $CO_2$ permeance ($P_{CO2}$/l,) was reduced by approximately 5 to 25%, while the permeance ratio ($P_{CO2}/P_{CH4}$) was reduced by approximately 18 to 85%. The reductions in both the $CO_2$ permeance and $P_{CO2}/P_{CH4}$ permeance ratio were most drastic at the higher pressure range. In contrast to our findings for the carbon membranes of the invention, the $P_{CO2}/P_{CH4}$ permeance ratio for the aromatic polyimide fibers, in particular, was considerably reduced at high pressure.

In comparing these findings (for aromatic polyimide fibers), the robustness of the carbon membranes of the invention at high pressures and in the presence of organic vapor impurities is an important discovery.

TABLE 6

| Temperature | $P_{CO2}$/l ($10^{-6}$ cm$^3$ (STP)/ cm$^2$ · s · cm Hg) | | $P_{CO2}/P_{CH4}$ | |
| --- | --- | --- | --- | --- |
| (° C.) | 200 psia | 800 psia | 200 psia | 800 psia |
| 50 | 17 | 11 | 14 | 3 |

What is claimed is:

1. A carbon membrane for separating first and second gases from a feed mixture of gases, the membrane comprising:
    an asymmetric hollow filamentary carbon membrane, comprising a partial carbonization product of an asymmetric hollow filament comprising an aromatic imide polymer material, comprising at least 95 weight percent carbon, and having a dense layer located in the outside surface portion of the hollow filamentary membrane and a porous base layer continued from the dense layer and located in the inside portion of the hollow filamentary membrane;
    wherein the carbon membrane is selectively permeable in favor of the first gas such that when a feed mixture containing the first and second gases contacts the carbon membrane, the first gas preferably passes through the membrane thereby forming a permeate enriched in the first gas and a retentate depleted in the first gas.

2. The membrane of claim 1 wherein:

the membrane is capable of withstanding contacting the feed mixture of first and second gases at pressures in excess of 200 psia when forming the enriched permeate and the depleted retentate.

3. The membrane of claim 2 wherein:

said membrane can withstand a pressure of at least about 500 psia.

4. The membrane of claim 2 wherein:

said membrane can withstand a pressure of at least about 1000 psia.

5. The membrane of claim 1 wherein:

the thickness of the carbon membrane is at least 20 micrometers.

6. The membrane of claim 1 wherein:

the thickness of the carbon membrane is between 20 and 40 micrometers.

7. The membrane of claim 1 wherein:

said carbon membrane comprises at least 98 weight percent carbon.

8. The membrane of claim 1 wherein:

the mixture of gases includes natural gas and $CO_2$ and said membrane is capable of withstanding contacting the natural gas and $CO_2$ mixture at pressures in excess of 200 psia and wherein at least a portion of $CO_2$ in said mixture preferentially passes through said carbon membrane when so contacted thereby forming a $CO_2$-enriched permeate and a $CO_2$-depleted retentate.

9. The membrane of claim 8 wherein:

said carbon membrane has a ratio of $CO_2$ permeability to natural gas permeability of at least about 30:1.

10. The membrane of claim 8 wherein:

said carbon membrane has a ratio of $CO_2$ permeability to natural gas permeability of at least about 40:1.

11. The membrane of claim 8 wherein:

said carbon membrane has a ratio of $CO_2$ permeability to natural gas permeability of at least about 50:1.

12. A carbon membrane for separating first and second gases from a mixture of gases, the membrane comprising:

a hollow filamentary carbon membrane, comprising a partial carbonization product of a hollow filament comprising a polymer material, comprising at least 95 weight percent carbon;

wherein the carbon membrane is selectively permeable in favor of the first gas such that when a feed mixture containing the first and second gases contacts the carbon membrane, the first gas preferably passes through the membrane thereby forming a permeate enriched in the first gas and a retentate depleted in the first gas.

13. The carbon membrane of claim 12 wherein:

the hollow filamentary membrane is asymmetric.

14. The carbon membrane of claim 13 wherein:

the asymmetric membrane has a dense layer and a porous base layer.

15. The carbon membrane of claim 14 wherein:

the dense layer is located on the outside surface portion of the hollow filamentary membrane and the porous base layer continues from the dense layer and is located in the inside portion of the hollow filamentary membrane.

16. The carbon membrane of claim 12 wherein:

the partial carbonization product is made from an imide polymer.

17. The carbon membrane of claim 16 wherein:

the imide polymer is aromatic.

18. The membrane of claim 12 wherein:

the carbon membrane has a ratio of $CO_2$ permeability to natural gas permeability of at least about 30:1.

19. A separation module for separating a first gas and a second gas from a feed mixture, the module comprising:

a shell and tube separation module including a plurality of asymmetric hollow filamentary carbon membranes, each membrane comprising a partial carbonization product of an asymmetric hollow filament comprising an aromatic imide polymer material, comprising at least 95 weight percent carbon, and having a dense layer located in the outside surface portion of the hollow filamentary membrane and a porous base layer continued from the dense layer and located in the inside portion of the hollow filamentary membrane;

the module having an upstream end and a downstream end wherein when the feed mixture is introduced into the upstream end, a first gas enriched permeate and a first gas depleted retentate is formed.

20. The module of claim 19 wherein:

the first gas is $CO_2$ and the second gas is natural gas; and the carbon membrane has a ratio of $CO_2$ permeability to natural gas permeability of at least about 30:1.

21. The module of claim 19 wherein:

the carbon membranes are capable of withstanding contacting the feed mixture of first and second gases at pressures in excess of 200 psia when forming the enriched permeate and the depleted retentate.

22. A process for making an asymmetric hollow filamentary carbon membrane, the process comprising:

forming an asymmetric hollow filament comprising an aromatic imide polymer material and having a dense layer located on the outside surface portion thereof and a porous base layer continued from the dense layer located on the inside of the dense layer; and pyrolyizing the asymmetric hollow filament to produce a membrane including a partial carbonization product of the asymmetric hollow filament;

wherein the membrane comprises at least 95 weight percent carbon.

23. The process of claim 22 wherein:

the membrane has a ratio of $CO_2$ permeability to natural gas permeability of at least about 30:1.

24. The process of claim 22 wherein:

the membrane has a ratio of $CO_2$ permeability to natural gas permeability of at least 40:1.

25. The process of claim 22 wherein:

the membrane has a ratio of $CO_2$ permeability to natural gas permeability of at least 50:1.

* * * * *